United States Patent
Coles

(10) Patent No.: US 6,469,735 B2
(45) Date of Patent: *Oct. 22, 2002

(54) SECURITY SYSTEM WITH LOCATABLE PORTABLE ELECTRONIC CAMERA IMAGE TRANSMISSION

(76) Inventor: Christopher F. Coles, 23 Clifton Road, Salisbury SP2 7BP (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/760,104

(22) Filed: Jan. 12, 2001

(65) Prior Publication Data

US 2001/0001561 A1 May 24, 2001

Related U.S. Application Data

(63) Continuation of application No. 09/013,367, filed on Jan. 26, 1998, now Pat. No. 6,181,373, which is a continuation of application No. 07/720,865, filed on Sep. 11, 1992, now Pat. No. 5,712,679.

(30) Foreign Application Priority Data

Jan. 16, 1989 (GB) ............................................. 8900837
Jun. 2, 1989 (GB) ............................................. 8912788
Jan. 16, 1990 (GB) ............................... PCT/GB90/00062

(51) Int. Cl.[7] .............................. H04N 7/20; H04N 7/18
(52) U.S. Cl. ...................................... 348/158; 348/143
(58) Field of Search ........................ 348/143, 148–149, 348/151, 158

(56) References Cited

U.S. PATENT DOCUMENTS

| | | | | |
|---|---|---|---|---|
| 3,440,635 A | | 4/1969 | Hull ........................... 340/277 |
| 3,984,625 A | * | 10/1976 | Camras ....................... 348/158 |
| 4,001,805 A | | 1/1977 | Colbe .......................... 340/280 |
| 4,097,893 A | * | 6/1978 | Camras ....................... 348/158 |
| 4,445,118 A | | 4/1984 | Taylor et al. ................ 343/357 |
| 4,516,157 A | * | 5/1985 | Campbell .................... 348/158 |
| 4,605,959 A | * | 8/1986 | Colbaugh .................... 348/158 |
| 4,611,198 A | * | 9/1986 | Levinson et al. ............ 340/539 |
| 4,701,797 A | * | 10/1987 | Ferreira ....................... 348/724 |
| 4,802,008 A | | 1/1989 | Walling ....................... 358/141 |
| 4,814,711 A | * | 3/1989 | Olsen et al. ................. 324/331 |
| 4,819,053 A | | 4/1989 | Halavais ...................... 342/353 |
| 4,884,132 A | | 11/1989 | Morris et al. .................. 358/93 |
| 5,045,937 A | * | 9/1991 | Myrick ........................ 348/144 |
| 5,222,152 A | * | 6/1993 | Fishbine et al. ............ 382/127 |
| 5,267,042 A | * | 11/1993 | Tsuchiya et al. ............ 348/239 |
| 5,677,979 A | * | 10/1997 | Squicciarini et al. ......... 386/46 |
| 5,712,679 A | | 1/1998 | Coles .......................... 348/158 |
| 5,790,188 A | * | 8/1998 | Sun ............................. 348/144 |
| 6,181,373 B1 | * | 1/2001 | Coles .......................... 348/158 |

FOREIGN PATENT DOCUMENTS

| | | | |
|---|---|---|---|
| CH | 651984 | 10/1985 | ............ H04N/7/00 |
| EP | 0 242 099 | 4/1987 | ............. G01S/5/14 |

OTHER PUBLICATIONS

Civil GPS from a Future Prospective, Thomas A. Stansell, Jr., Proceeding of the IEEE, vol. 71, No. 10, Oct. 1983.

* cited by examiner

Primary Examiner—Vu Le
(74) Attorney, Agent, or Firm—Womble Carlyle Sandridge & Rice, PLLC

(57) ABSTRACT

A method of detecting a breach of security in a first location and providing information about the breach of security to security personnel in a remote location is provided. The method includes acquiring global positioning signals at the first location upon the breach of security and transmitting the global positioning signals to the remote location. The method further may include acquiring a digital image of the first location and transmitting the digital image to the remote location along with the global positioning signals. Personnel at the remote location are thus notified of the breach of security and also are provided the position and a photograph of the first location for taking action appropriate to the breach.

16 Claims, 1 Drawing Sheet

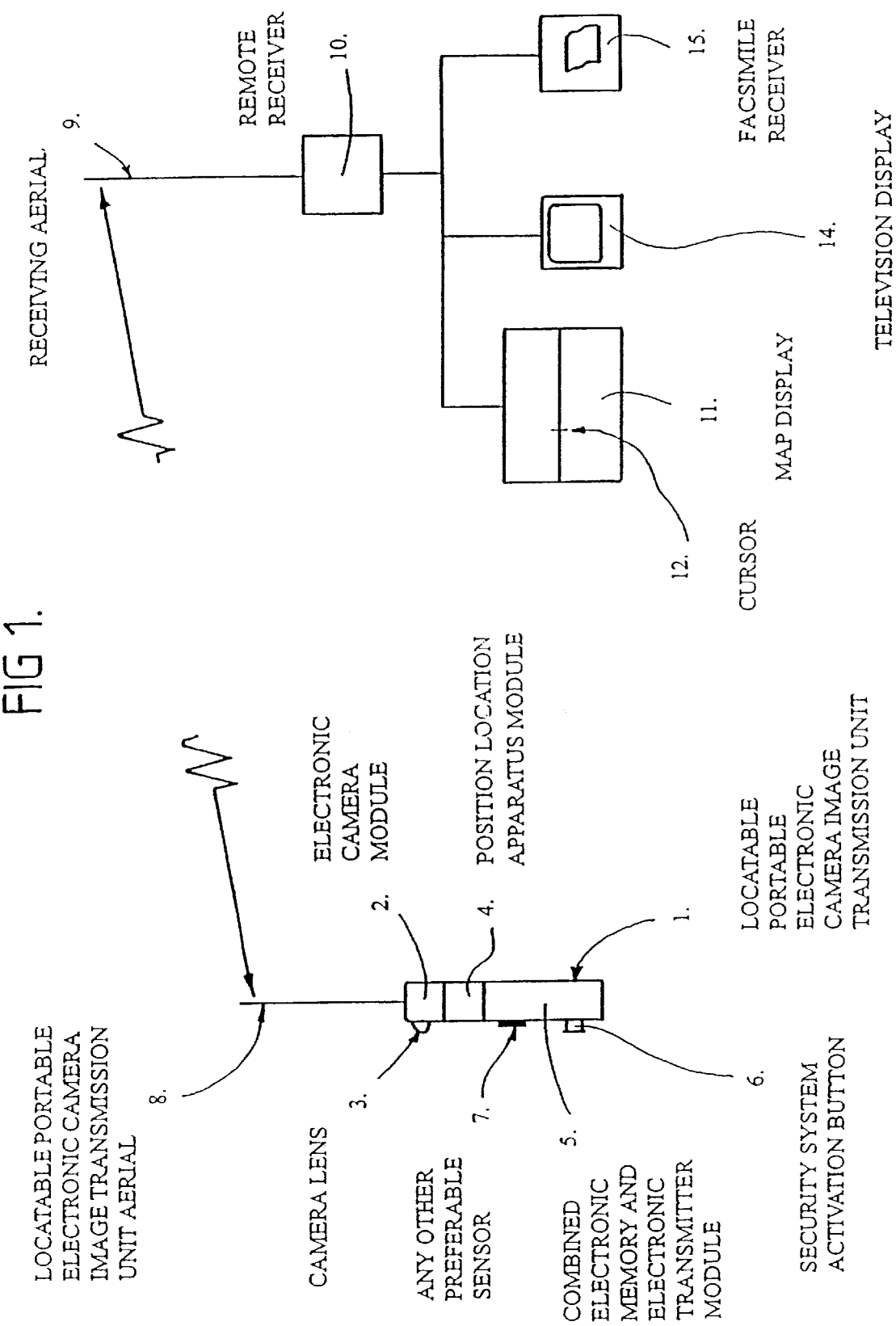

SECURITY SYSTEM WITH LOCATABLE PORTABLE ELECTRONIC CAMERA IMAGE TRANSMISSION

CROSS REFERENCE TO RELATED APPLICATIONS

This is a continuation of U.S. patent application Ser. No. 09/013,367 filed Jan. 26, 1998, now U.S. Pat. No. 6,181,373 which, in turn, is a continuation of Ser. No. 07/720,865 filed Sep. 11, 1992, now U.S. Pat. No. 5,712,679.

TECHNICAL FIELD

The present invention relates to a photographic security system.

BACKGROUND

In U.S. Pat. No. 4,651,143 there is disclosed a security system including a television camera for taking a scene of a trespass upon a predetermined region at a site to be monitored, a video recorder for recording the image of the scene taken by the television camera, and a sensor for sensing a trespass and outputting a signal for starting the television camera and the video recorder. The signal output from the sensor for sensing a trespass and the outputs of a plurality of other sensors sensing other conditions at the site to be monitored are transmitted to a monitoring site remote from the site to be monitored for display at the monitoring site.

In EP-A-0242099 there is disclosed an anti-theft and locating system in which a microprocessor monitors vehicle personal position by way of coordinates obtained from Navstar Global Positioning System. Upon activation, through sensing unauthorized access to a vehicle or a change in its position, the microprocessor identifies itself to a central dispatch office and alerts the same to the nature of the disturbance. The system periodically updates vehicle location by way of digital signals sent to the central dispatch station by way of a cellular mobile telephone system. The central dispatch office can interrogate the microprocessor via the telephone link by addressing its unique serial number in order to obtain its position should the vehicle be stolen without activation of the microprocessor. A plurality of logic inputs and outputs are provided for accommodating conventional anti-vandalism and anti-theft detectors which may be integrated into the total protection system.

SUMMARY OF THE INVENTION

In accordance with the present invention there is provided a security apparatus comprising in combination an electronic camera and a transmitter for transmitting the image received by the electronic camera to a remote receiver characterised in that the apparatus is portable and includes a position location apparatus and in that the transmitter also transmits the positional information received from the position location apparatus.

The present invention also provides the combination of the aforesaid portable security apparatus and a remote receiving apparatus adapted to receive the information transmitted by the transmitter of the portable security apparatus.

BRIEF DESCRIPTION OF THE DRAWING

FIG. 1 is a diagrammatic view of a security system that embodies principles of the invention in a preferred form.

DETAILED DESCRIPTION OF THE PREFERRED EMBODIMENTS

The present invention will now be described, by way of example, with reference to FIG. 1 of the accompanying drawings which show schematically a portable photographic security apparatus of the present invention, in which the portable photographic security system transmitter 1 is made up from a number of interconnected elements, each of which is known per se as a separate unit, namely an electronic camera module 2, with a lens 3, a Global Positioning System (GPS) module 4, and a combined memory and transmitter module 5. The memory and transmitter module 5 preferably have an activation button 6 and provision is made for any other preferable sensor 7, for example, a microphone. This may be convenient to allow transmission of what may be heard being said. Again such a microphone may preferably activate the system if a loud noise such as a gunshot or scream takes place.

Any activation of the system will immediately cause the following to happen. One—calculation of the exact position of the portable photographic security system transmitter via the GPS module. Two—activate as necessary the electronic camera module to photograph the immediate area. Three—store all this information electronically within the internal memory while at the same time transmitting the name and address of the user, date, time of day, exact location, a photograph of the immediate area plus preferably sound.

All this information may preferably be transmitted using existing radio transmission systems, for example, cellular radio, via an aerial 8 to a receiving aerial 9 connected to a distant receiver 10. The receiver 10 may be in turn preferably connected to a map display 11. Map display 11 may preferably be so constructed as to be able to move a crosswire 12 immediately to show the actual location of the portable photographic security system transmitter 1 upon the map. The receiver 10 may preferably be connected to a television display 14, thus giving direct display of any visual picture and sound transmission, along with the other location and user information. The receiver 10 may also preferably be connected to a facsimile receiver 15 giving a hard copy of the transmitted image and information.

At first glance this combination of modules would appear to need a substantial size external package to hold them all. A GPS system as proposed by Philip G. Mattos "Global Positioning by Satellite", Electronics & Wireless World, February 1989 still needs a package volume of 80 mm by 125 mm by 25 mm. However, the capacity of the electronics within such a GPS system are known to be vastly under-utilised. It is therefore possible to utilise this spare capacity to permit a substantial reduction of the volume mass of electronics which are required in the other modules. For example, the IMS T222 transputer (a new type of electronic chip) has the capacity of a 10 MIP parallel processing computer. Thus we can place all of the signal processing functions for all of the other modules onto such a transputer by simply scheduling any convenient sequence of software events to suit the particular needs. The resulting small package of electronics creates a range of completely new products and markets. For example, a child or young girl on the way to or from school will be able to alert his or her parents to any potential danger en route. An attractive and vulnerable young woman walking home at night can alarm the police (or indeed any convenient person) of potential as well as actual danger.

Thus the proposed portable photographic security system will provide substantially enhanced security to any person travelling while at the same time simple adaptions will make possible the use of such a system in any vehicle or building.

What is claimed is:

1. A method of detecting a breach of security in a first location and providing information regarding the breach of security to security personnel in a remote location, said method comprising the steps of:

(a) upon the breach of security at the first location, acquiring global positioning signals at the first location, calculating the position of the first location based upon the acquired global positioning signals, converting the calculated position into transmittable data representative of the position, acquiring a digital image of the vicinity of the first location, and converting the digital image into transmittable data representative of the digital image;

(b) at the first location, generating a transmittable signal that contains the data representative of the calculated position of the first location and the data representative of the digital image;

(c) transmitting the transmittable signal from the first location to the remote location;

(d) receiving the transmitted signal at the remote location;

(e) at the remote location, extracting from the received signal the data representative of the position of the first location and extracting from the received signal the digital image;

(f) at the remote location, presenting the extracted data representative of the position of the first location and presenting the digital image in a form usable by security personnel to identify the position of the first location.

2. A method of detecting a breach of security as claimed in claim 1 and further comprising the step of initiating steps (a) through (h) by activating a manually operable switch.

3. A method of detecting a breach of security as claimed in claim 1 and further comprising the step of initiating steps (a) through (h) upon the occurrence of a predetermined condition.

4. A method of detecting a breach of security as claimed in claim 3 and wherein the predetermined condition is ambient sound in the vicinity of the first location.

5. A method of detecting a breach of security as claimed in claim 1 and wherein step (a) comprises acquiring the global positioning signals from the Global Positioning Satellite (GPS) array.

6. A method of identifying the position of a first location to security personnel in a remote location upon the occurrence of a distress condition at the first location, said method comprising the steps of:

(a) acquiring global positioning signals at the first location and acquiring an image of the first location upon occurrence of the distress condition, the global positioning signals being indicative of the position of the first location;

(b) converting the acquired global positioning signals and the acquired image into transmittable data;

(c) generating a transmittable signal that contains the transmittable data;

(d) transmitting the transmittable signal to the remote location;

(e) receiving the transmitted signal at the remote location;

(f) at the remote location, extracting from the received signal the position of the first location and the image and presenting the position of the first location and image to security personnel at the remote location as a part of an alarm indicating the distress condition at the first location; and (g) at the remote location, taking action appropriate to the distress condition.

7. The method of claim 6 and wherein step (a) comprises acquiring signals from the Global Positioning Satellite (GPS) array.

8. The method of claim 6 and wherein steps (a) through (g) are initiated by activating a manually operable switch at the first location upon occurrence of the distress condition.

9. The method of claim 6 and wherein steps (a) through (g) are initiated upon occurrence of a predetermined stimulus at the first location.

10. The method of claim 9 and wherein the predetermined stimulus is ambient sound in the vicinity of the first location above a predetermined threshold.

11. The method of claim 6 and wherein step (a) further includes acquiring sound from the first location upon occurrence of the distress condition, step (b) further includes converting the acquired sound to transmittable data, and step (f) further includes extracting the sound from the received signal and presenting the extracted sound to security personnel in conjunction with the image and position of the first location.

12. The method of claim 6 and wherein step (g) includes contacting the first location from the remote location to inquire regarding the distress condition.

13. A method of identifying the position of a first location to security personnel at a remote location, said method comprising the steps of:

(a) receiving global positioning signals at the first location;

(b) obtaining an image of the first location; and (c) transmitting the received global positioning signals and the obtained image from the first location to the remote location.

14. The method of claim 13 and further including the step of initiating steps (a) (b) and (c) through activation of a manually operable switch at the first location.

15. The method of claim 14 and wherein activation of the manually operable switch is in response to a distress condition at the first location.

16. The method of claim 14 and wherein the global positioning signals are acquired from the Global Positioning Satellite (GPS) array.

* * * * *